Dec. 4, 1956  A. GRABBERT  2,772,679
OPTICAL PHOTOLUMINESCENT INDICATING DEVICE FOR
HIGH FREQUENCY THERAPEUTIC TREATMENT CIRCUIT
Filed July 11, 1952  2 Sheets-Sheet 1

INVENTOR

Arnulf GRABBERT

Dec. 4, 1956  A. GRABBERT  2,772,679
OPTICAL PHOTOLUMINESCENT INDICATING DEVICE FOR
HIGH FREQUENCY THERAPEUTIC TREATMENT CIRCUIT
Filed July 11, 1952  2 Sheets-Sheet 2
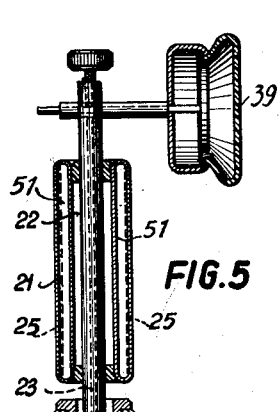
FIG.5
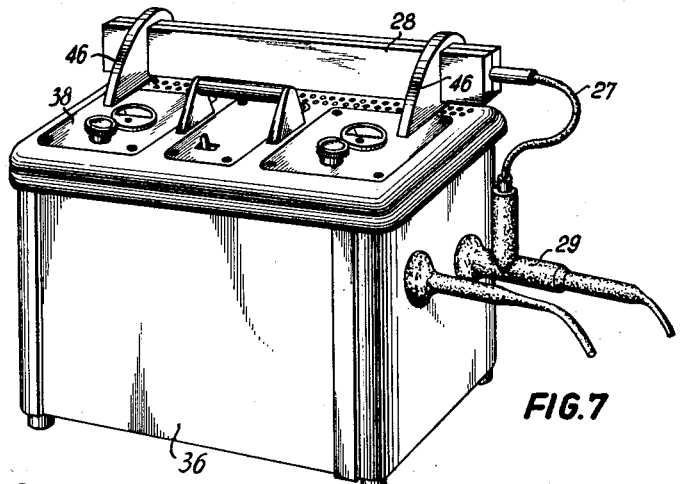
FIG.6  FIG.7
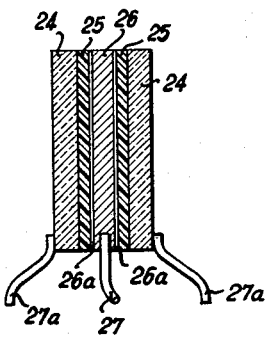
FIG.8
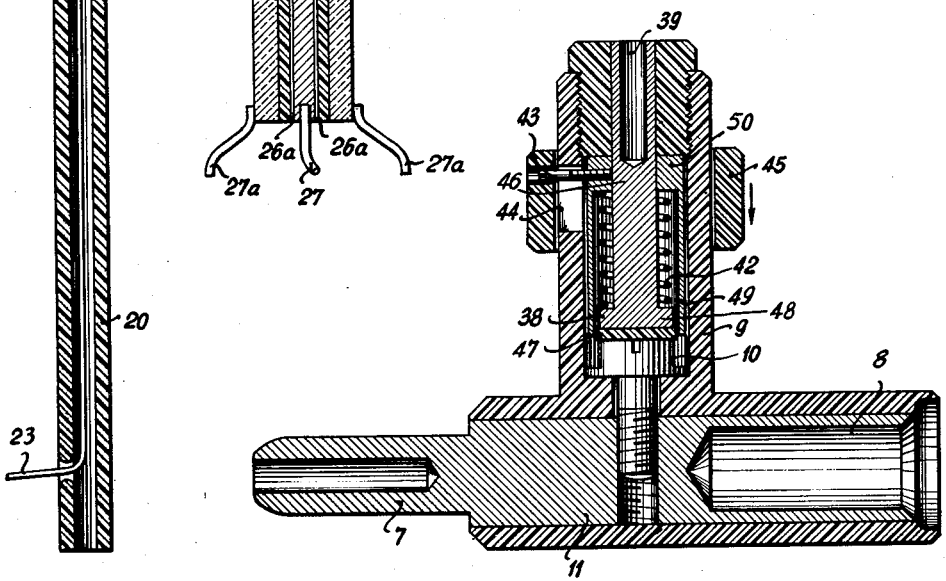
INVENTOR
Arnulf GRABBERT
BY

2,772,679
Patented Dec. 4, 1956

2,772,679

OPTICAL PHOTOLUMINESCENT INDICATING DEVICE FOR HIGH FREQUENCY THERAPEUTIC TREATMENT CIRCUIT

Arnulf Grabbert, Wiesbaden, Germany

Application July 11, 1952, Serial No. 298,322

2 Claims. (Cl. 128—421)

This invention relates to a device for optical indication and remote control of the output and tuning of electro-medical therapeutic apparatuses operating, for instance, with short waves or ultra-short waves or decimeter waves and serving to treat a patient with high frequency energy.

It is an object of the present invention to provide simple and reliable means optically indicating the energy which is effective in the patient or output circuit, without causing any inertia between changes of the energy and changes of the indication.

A special object of the invention is to provide means controlling such subdivided energy in order to enable the physician to conform the dose which is applied to a patient, to the diagnosis and to the intended therapeutic treatment.

A further object of the invention is to provide means permitting a highly sensitive indication of the tuning which is visible from all sides of the apparatus showing whether the high frequency circuit is operating satisfactorily during a treatment.

Another object of the invention is to provide means visibly indicating the operation of the high-frequency apparatus in such a way that the indication can be inspected from several or any directions and from remote places.

A still further object of the invention is to provide means for indicating the dose or, in case of impulses or undulating currents, the undulating impulse applied to the patient's circuit so as to permit a psychological effect with respect to the patient who is enabled to follow up for himself the function of the high frequency.

A special object of the invention is to provide means permitting a perfect therapeutic utilization and efficiency of the apparatuses used, of the various electrodes, and of all accessories for electro-surgery.

With these and other objects in view, this invention consists in the detals of construction, combination of elements and operation hereinafter set forth and then specifically designated by the claim.

In order that those skilled in the art to which this invention appertains may understand how to make and use the same, I will describe its construction in detail, referring by numerals to the accompanying drawings forming part of this application, in which.

Figure 3:
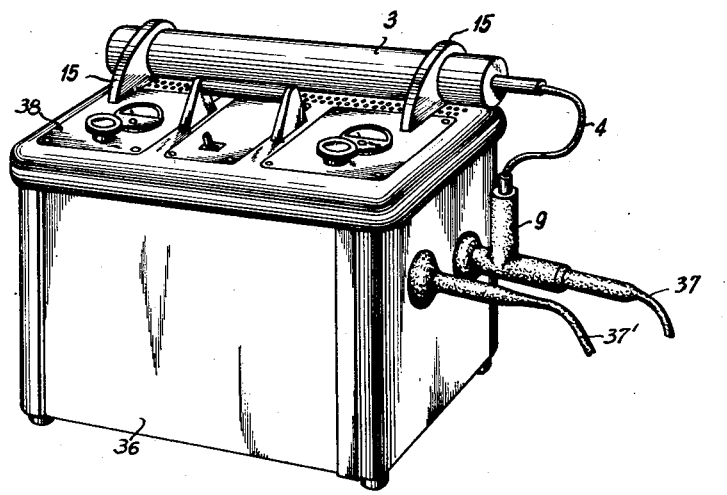
Figure 4:
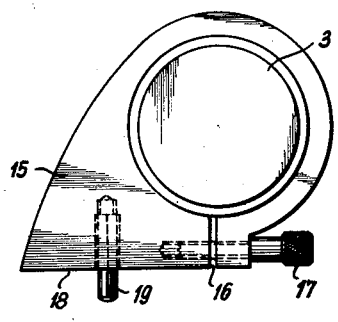

Fig. 3 is an isometric view of the indicator arranged on a short wave generator, Fig. 4 is an end view of a clamp adapted for fastening the indicator on the short wave apparatus, Fig. 5 is an axial section of an electrode and electrode holder with the indicator according to the invention applied thereto, Fig. 6 is a cross sectional view of a modified form of the indicator, Fig. 7 is an isometric view similar to Fig. 3, but showing a modified form of indicator as more specifically illustrated in Fig. 6, Fig. 8 is an axial section showing a modified form of coupler.

Similar reference numerals denote similar parts in the different views.

Figure 1:
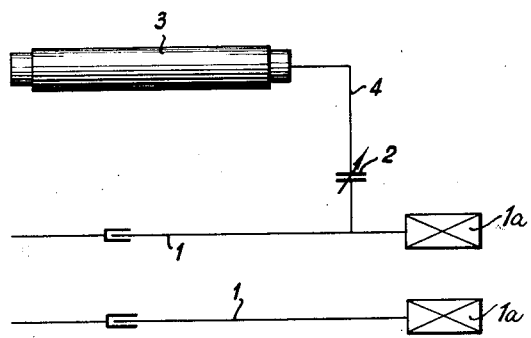
Fig. 1 is a wiring diagram used in connection with an apparatus made according to the invention.

Referring now to the drawings in greater detail, and first to Fig. 1, it will be seen that luminescent or fluorescent tube 3 is connected, by a flexible insulated cable 4, with the patient or output circuit 1 of a short wave generator including the electrodes 1a, through one or more coupling elements 2 which may be fixed coupling elements, e. g., condensers, of different size or infinitely variable coupling elements, in such a way that this device permits a permanent optical indication of the actual output, without any inertia, which can be viewed both by the person carrying out the treatment and by the patient. The fluorescent tubes react to the output without any inertia, by variation of the length of the luminescent column, similar to the mercury column of a thermometer, and by the intensity of the light radiated. Moreover, in order to increase the psychological effect in relation to the patient observing the indication, luminescent substances radiating a coloured light may be used, or coloured glass covers may be slipped over the fluorescent tubes radiating a white light, or coloured lacquer coatings, may be applied. Thus, automatically a double indication takes place which is so striking that it can be judged or estimated from any point of the room or even at a great distance from outside the room. Owing to the extreme sensibility of the luminescent or fluorescent tube, the operation of the device does not depend on a certain minimum amount of output but it reacts even to the smallest doses applied. As is well known, in therapeutics for certain special cases it is important to permit an extremely fine determination or dosage of small outputs which can be achieved by my novel device.

The luminescent tube 3 can be connected to the patient or transmitter circuit 1 through said capacity 2 at any proper point, unipolarly or bipolarly. Several fixed condensers of different size operable through a step switch or an infinitely variable condenser 2 may be used to preserve the fluorescent tubes 3 against excessive amounts of energy and to increase their life, especially where larger patient outputs are required (more particularly in case of large apparatuses of upward of 400 watts output). It is also contemplated, however, to provide a variable inductive coupling for this purpose, in place of the condenser 2.

Figure 2:
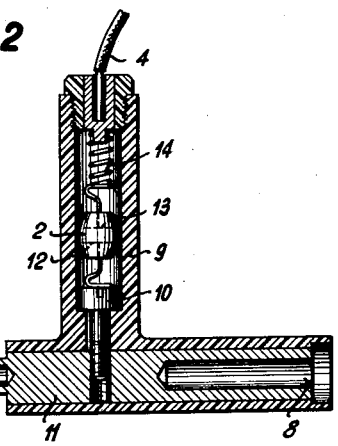
Fig. 2 is a sectional view of a three-way coupler.

In case of smaller apparatuses the luminescent tubes may be connected to the patient circuit by three-way couplers, as seen in Fig. 2, which are shaped in the form of a plug 7 on the one side and in the form of a sleeve or plug socket 8 on the opposite side. The coupling plug member 7 is put into the socket of the short wave apparatus 36, Fig. 3, and the plug of the patient's cable 37 is put into the sleeve-shaped part 8 of the coupler. A tubular T-piece 9 of insulating material is secured to the metal 11 of the coupler by means of a screw 10. Connected to said screw 10 is one metal coating 12 of a small ceramic condenser 2, whereas the other coating 13 thereof leads to the luminous tube through a short spiral spring 14 and a flexible insulated lead 4. The coupler or couplers may be plugged into one or both plug sockets of the short wave transmitter 36, i. e., individually or simultaneously, whereby it is also possible to find out whether the ultra-short wave energy is symmetrically present in both patient's cables 37 and 37'. It is also possible to connect two or more luminous tubes simultaneously to one short wave apparatus. The tubes may be arranged on the operating board or they may be built in or built up at one or more sides of the apparatus.

My novel device may be provided on the ultra-short wave apparatus as it is constructed or it may be fitted subsequently to existing apparatuses by holder means, in the manner shown in Fig. 3. To this end two clamps 15 of a synthetic material of a high breaking strength and toughness (see Fig. 4), are slotted at 16. Transversely to the slot is arranged a long knurled screw 17 having a relatively small head and being adapted for sensitively tightening the clamps 15 on the luminous tube 3 without crushing the glass body thereof. The clamps have a flat face 18 engaging the top face of the casing of the apparatus 36. Moreover, a slotted pin 19 is screwed into the flat face 18 of each clamp so as to fit into corresponding bores of the perforated cover of the switchboard 38. For technological reasons these bores have different distances and are of different diameters. By lateral sliding and rotation of the clamps 15 about the axis of the luminous tube it is possible to adapt the arrangement to any existing ultra-short wave apparatus without requiring any change on the same.

It will be understood that my novel device can be used instead of the normal measuring instrument or may extend parallel thereto or may be built to an auxiliary control device. The length of the luminous tube will be formed and arranged so that it can be used in connection with most of the normal size short wave apparatuses with reasonable minimum output. Moreover, the coupling members may be dimensioned and arranged in such a way that the luminous tube as a component of the system can also be arranged separately from the apparatus at another point, for instance, on the outer wall of the box in which the patient is treated or above the desk of the physician.

It is also possible to join the device to electrode arms 20, as seen in Fig. 5 and if desired the luminous tube 21 may be constructed in the form of a double-walled cylindrical tube 22 in such a way that the conductor 23 for high frequency current may be passed through the hollow space 22 of the luminous tube 21. In this case, the luminous tube 21 is inductively coupled to the patient circuit by said conductor 23. The electrode 39 is arranged on the electrode holder 20 in a known manner, with a universal joint 40 which is known in the art and will not require further explanation. The luminescent layer 25 is applied to the inner surface of the outer walls of the tube 21, within the evacuated toroidal space 51, as indicated in dotted lines.

According to a further important feature of the present invention my novel remote indicator device is provided with electroluminescent radiators producing a radiation of light without vacuum, under action of an electric alternating field.

Fig. 6 shows the general arrangement of such an electroluminescent radiator constructed in the manner of a flat condenser. It consists of a pair of outer plates 24 of glass or synthetic material of any shape, which is transparent, but treated so as to be conductive. For radiation in two opposite directions, two such plates are provided although one plate 24 would be sufficient to produce the luminescent effect. Applied thereto are thin layers 25 of a compound of the zinc sulphide group having a thickness of about 0.25 mm., which layers are provided on their free side with a thin foil-like metal coating 26a. In order to increase the mechanical strength and to provide a reliable connection with the electric connecting cable 27 these coatings 26a may be reinforced by a metallic base or support 26.

The indicator seen in Fig. 6 is electrically connected to a source of current on the one hand by leads 27 joined to the metal foils 26a or to the metallic support 26 thereof, and on the other hand by leads 27a joined to the transparent but conductive layers 24. Thus the luminescent light is excited in the layers 25 whereby the transparent plates 24 can radiate. It is not always necessary for the plates 24 to be galvanically connected to the source of current since in general with the high frequencies used in the apparatus owing to the relatively high charging voltages occurring by the condenser effect the required electric field strength for exciting the luminescent radiation will be available without cable connection.

In order to provide a certain preliminary excitation of the luminescent layer a preliminary voltage of a suitable amount and kind may be applied to the plates 24 and 26, which preliminary potential is connected to suitable points 52, 53 of the circuit through suitable capacities from 0.5 to 50 microfarad.

Depending on the combination of substances of the zinc sulphide group provided for the luminescence radiator a luminescent light of different colors can be obtained. The intensity of the light depends on the thickness of the material, its specific resistance, its dielectric constant, and the field strength. Moreover, the color of the light varies with increasing or decreasing field strength. Also a change of the operating frequency applied will cause a change of the color of the light. For these reasons said "cold" source of light is particularly adapted to provide a remote control of the dose and of the tuning and is also adapted to produce remarkable psychological effects. It is also adapted to be arranged directly in the patient electrodes or in the vicinity thereof, i. e., in the region of the high field strength passing from the electrode to the patient.

Fig. 7 shows the arrangement of the luminescent radiator of Fig. 6 on a short wave apparatus 36, 38 for the purpose of a remote control of the dose and of the tuning. It is also possible, however, to accommodate the device on any other part of the apparatus.

The luminescent radiators according to the present invention may also be used to indicate output, impulse or pulsating currents. In low and medium frequency therapeutic devices the radiators are connected to the patient circuit in a suitable manner using corresponding coupling elements, permitting a reliable control of the amount of the dose and the course of the impulse or undulating currents.

It is particularly advantageous that my novel device enables the patient himself to observe the correct course of the dose and the proper operation of the therapeutic apparatus so that in case of changes of the indication, e. g., in case of disturbances of the apparatus or in case of inadmissible changes of the line voltage he may immediately call the physician or the operator.

A modified and improved form of the coupler adapted for connection of the radiator to a short wave apparatus of Fig. 4 is shown in Fig. 8. It has been found that with the high frequencies occurring in operation the outer circuit 37, 37' coming from the short wave apparatus 36 acts like a Lecher system forming stationary waves. Therefore, in some instances in practical operation e. g. owing to a special arrangement of the electrodes in the patient circuit, a potential node may be present at, or in the vicinity of, the point where the screw 10 takes the energy for operation of the tuning or indicating device. Since the high frequency voltage prevailing at this point has to be transmitted through the capacity formed between the parts 10 and 46, the voltage available at the cable 27 may be so low that no excitation of the tuning indicator, i. e., no luminescence is started. In case of short-circuiting of the condenser 10/46, on the contrary, the luminous radiator would be excited immediately and the lighting would continue if the short circuit would be removed and the condenser 10/46 would be reinserted, provided that the circuit is not interrupted. This condition is fulfilled by the construction of the three-way coupler seen in Fig. 8. In this case, the condenser is formed by the screw head 10, an insulating disc 47, and a bolt 46 which at one end is formed with a flange 48.

Mounted on the tubular member 9 is a metal sleeve 49 having at its end an inwardly directed flange 50 and being slidable in member 9 by operation of an insulating ring 45 of insulating material which is connected to sleeve 49 by a stud 43 extending through a longitudinal slot 44 in the member 9. A spiral spring 42 on the one hand presses the flanged part of bolt 46 against the insulating disc 47 and on the other hand urges the metal sleeve 50 in upward direction. On depression of the ring 45 in the direction of the arrow the metal sleeve 49 is advanced towards the screw head 10. The flanged projection of this screw head 10 comes thus in contact with the lower edge of the metal sleeve 49, and the condenser formed by the elements 10, 47 and 46 is short-circuited, whereby the luminous effect of the luminescent radiator sets in immediately. As soon as the ring 45 is released, the metal sleeve 49 recedes upwardly under action of the spiral spring 42. Thus the condenser 10, 47, 46 is reinserted while the luminous effect initiated before is maintained.

The increase of the voltage for the luminescent radiator and so a reliable response thereof even where the matching conditions happen to be unfavorable can also be achieved by other means. For instance, by displacing the phase position of the point where the voltage is taken off, by means of telescopically slidable tubular members, or variable capacities or inductances (not shown) inserted in the high frequency circuits such a displacement of the phase can be achieved and thus the voltage amplitude can be adjusted from the zero value to the maximum value.

The luminescent element may be calibrated in such a way that the output which has been adjusted, can easily be reproduced by observing the indication of the luminescent element.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

Having thus described what is new and desired to be secured by Letters Patent, is:

1. In combination with an electro-therapeutic short wave apparatus; a casing, perforated covering means on said casing, an output circuit, an indicating device comprising a luminescent element including a transparent carrier which is at least partly coated on its inner side with a luminescent material, holder means for said element including a pair of clamps each having a flat lower face, a slotted pin in said flat face, a knurled screw adapted to fasten the clamp on the element, whereby the element can be secured to the casing of the apparatus by plugging said slotted pins into any of the perforations, and means for coupling said element with said output circuit in such a way that the state of tuning and the output of said circuit are optically indicated by the length of the luminous column and the intensity thereof, respectively.

2. In combination with an electro-therapeutic short wave apparatus; a casing, an output circuit, patient electrodes, electrode connecting cables and plugs, plug socket means adapted to receive the electrode cable plugs for connection of the electrodes to the output circuit, an indicating device comprising a luminescent element including a transparent carrier which is at least partly coated on its inner side with a luminescent material, a three-way coupler including a plug adapted to be plugged into said plug socket means, a plug socket adapted to receive the respective plug of the electrode cable, and interchangeable electric coupling means adapted for coupling said element with the output circuit.

References Cited in the file of this patent

UNITED STATES PATENTS

| | | |
|---|---|---|
| 776,359 | Slaby | Nov. 29, 1904 |
| 1,884,950 | Woodring | Oct. 25, 1932 |
| 1,928,407 | Batchelor | Sept. 26, 1933 |
| 2,017,897 | Emersleben | Oct. 22, 1935 |
| 2,117,544 | Coustal | May 17, 1938 |
| 2,189,279 | Bitner | Feb. 6, 1940 |
| 2,268,870 | Greenlee | Jan. 6, 1942 |
| 2,525,624 | Stahl | Oct. 10, 1942 |
| 2,566,349 | Mager | Sept. 4, 1951 |
| 2,624,342 | Di Perna | Jan. 6, 1953 |

FOREIGN PATENTS

| | | |
|---|---|---|
| 324,101 | Great Britain | Jan. 17, 1930 |